US011565321B2

(12) United States Patent
Foret et al.

(10) Patent No.: US 11,565,321 B2
(45) Date of Patent: Jan. 31, 2023

(54) METHOD FOR THE GENERATIVE MANUFACTURE OF A 3-DIMENSIONAL COMPONENT

(71) Applicant: Messer Industries USA, Inc., Bridgewater, NJ (US)

(72) Inventors: Pierre Foret, Munich (DE); Dominik Bauer, Germering (DE); Eric Hultstein, Munich (DE); Jürgen Scholz, Munich (DE); Sören Wiberg, Ekerö (SE)

(73) Assignee: Messer Industries USA, Inc., Wilmington, DE (US)

( * ) Notice: Subject to any disclaimer, the term of this patent is extended or adjusted under 35 U.S.C. 154(b) by 271 days.

(21) Appl. No.: 15/801,534

(22) Filed: Nov. 2, 2017

(65) Prior Publication Data

US 2018/0117675 A1    May 3, 2018

(51) Int. Cl.
*B33Y 10/00* (2015.01)
*B33Y 30/00* (2015.01)
(Continued)

(52) U.S. Cl.
CPC .......... *B22F 10/20* (2021.01); *B23K 26/1224* (2015.10); *B23K 26/144* (2015.10);
(Continued)

(58) Field of Classification Search
CPC . B22F 3/1055; B23K 26/1224; B23K 26/144; B29C 64/153; B33Y 50/02;
(Continued)

(56) References Cited

U.S. PATENT DOCUMENTS 3,943,751 A * 3/1976 Akiyama ............. G21C 17/002
376/256
2016/0045981 A1* 2/2016 Zurecki ................... B22F 12/00
219/76.12

(Continued)

FOREIGN PATENT DOCUMENTS

EP    3 075 470 A1    10/2016
GB    2418264 A  *  3/2006  ............ F01N 11/007
(Continued)

OTHER PUBLICATIONS

European Search Report and Written Opinion for 16020428.5-1373, May 29, 2017, The Hague, 9 pages.

*Primary Examiner* — Justin C Dodson
*Assistant Examiner* — Dilnessa B Belay
(74) *Attorney, Agent, or Firm* — Joshua L. Cohen

(57) ABSTRACT

A method and apparatus for the generative manufacture of a three-dimensional component in a processing chamber, in which the steps "providing a metallic starting material in the processing chamber" and "melting the starting material by means of energy input" are repeated multiple times, wherein a process gas is provided in the processing chamber are disclosed. The method is characterized by the steps: 1) the hydrogen content of the process gas or a sample of the process gas is determined; 2) the oxygen content of the process gas or a sample of the process gas is determined by means of an oxygen sensor and/or the dew point of the process gas or a sample of the process gas is determined; and 3) the values for the oxygen content and/or the dew point determined in step 2 are corrected by means of the value for the hydrogen content determined in step 1.

8 Claims, 2 Drawing Sheets

(51) Int. Cl.
  *B33Y 40/00*   (2020.01)
  *B33Y 50/02*   (2015.01)
  *B23K 26/12*   (2014.01)
  *B23K 26/144*  (2014.01)
  *B29C 64/153*  (2017.01)
  *C04B 35/65*   (2006.01)
  *B22F 10/20*   (2021.01)
  *G01N 30/88*   (2006.01)
  *G01N 27/407*  (2006.01)
  *B23K 26/342*  (2014.01)
  *B22F 10/30*   (2021.01)

(52) U.S. Cl.
  CPC ............ *B29C 64/153* (2017.08); *B33Y 10/00* (2014.12); *B33Y 30/00* (2014.12); *B33Y 40/00* (2014.12); *B33Y 50/02* (2014.12); *G01N 27/407* (2013.01); *G01N 30/88* (2013.01); *B01D 2253/1122* (2013.01); *B01D 2257/104* (2013.01); *B22F 10/30* (2021.01); *B22F 2999/00* (2013.01); *B23K 26/342* (2015.10); *C04B 35/652* (2013.01); *Y02P 10/25* (2015.11)

(58) Field of Classification Search
  CPC ......... B33Y 10/00; B33Y 30/00; B33Y 40/00; C04B 35/652
  See application file for complete search history.

(56) References Cited

U.S. PATENT DOCUMENTS

2016/0045987 A1    2/2016   Zurecki et al.
2016/0067779 A1    3/2016   Dautova et al.
2017/0304945 A1*  10/2017   Sutcliffe ................ B33Y 30/00

FOREIGN PATENT DOCUMENTS

JP       S60 157085 A      8/1985
WO     WO 2016/062714 A1   4/2016

* cited by examiner

METHOD FOR THE GENERATIVE MANUFACTURE OF A 3-DIMENSIONAL COMPONENT

CROSS REFERENCE TO RELATED APPLICATIONS

This application claimed priority from European Patent Application 16 020 428.5, filed on Nov. 2, 2016.

BACKGROUND OF THE INVENTION

The present invention pertains to a method for the generative manufacture of a three-dimensional component in a processing chamber, in which the steps "providing a metallic starting material in the processing chamber" and "melting the starting material by means of energy input" are repeated multiple times, wherein a process gas is provided in the processing chamber, and wherein the oxygen content of the process gas is determined. The invention furthermore pertains to a device for the generative manufacture of a three-dimensional component, which comprises a processing chamber with a production platform and an application device for applying the starting material onto the production platform, a laser for melting the starting material and a process gas supply device for supplying process gas into the processing chamber.

Generative manufacturing methods make it possible to produce various three-dimensional components with complex geometry.

In 3D printing, for example, three-dimensional workpieces are produced in layers. The workpieces are produced of one or more liquid or solid materials in a computer-controlled fashion based on predefined dimensions and shapes (CAD). Physical or chemical hardening or melting processes take place during the production. Typical materials for 3D printing are plastics, synthetic resins, ceramics and metals. 3D printers are used for industrial and research purposes. Such printers are furthermore used in the domestic and entertainment sectors, as well as in the arts.

3D printing is the generative or additive manufacturing method. The most important 3D printing techniques are selective laser melting and electron beam melting for metals, selective laser sintering for polymers, ceramics and metals, stereolithography and digital light processing for liquid synthetic resins and polyjet modeling, as well as fused deposition modeling, for plastics and some synthetic resins.

Another generative manufacturing method is selective melting and solidifying. In this type of methods, metal powder or a metal wire is molten in layers and solidified such that a three-dimensional component can be generated. The size of the molten pool being produced is small due to the locally limited energy input by means of a laser beam. It is therefore possible to produce filigree structures. Corresponding methods are commercially marketed as laser-engineered net shaping (LENS), direct metal deposition (DMD), laser additive manufacturing (LAM), selective laser melting (SLM), laser metal fusion (LMF) or laser metal deposition (LMD).

Local laser sintering or melting can either be carried out in the form of an indirect or a direct method.

Selective laser sintering (SLS) is a method for producing three-dimensional structures of a powdery starting material by means of sintering. Laser sintering is a generative manufacturing method: the workpiece is produced layer by layer. The effect of the laser beams therefore makes it possible to produce arbitrary three-dimensional geometries that may also feature undercuts, e.g. workpieces that cannot be produced with conventional mechanical or casting methods.

In selective laser sintering (SLS/LMF), a layer of powder material is applied onto a working surface (production platform). The loose powder is selectively molten by means of a laser beam. Depending on the material used, the powder particles are during this melting process connected within the layer, as well as to the layer located thereunder. Two distinct basic trends have emerged for the production of metallic components. In addition to directly solidifying metallic powder materials by means of laser radiation (direct metal laser sintering), the production of metallic components by means of a combination of SLS of plastic-encased metal powder and a subsequent thermal treatment (IMLS) already established itself at an early stage.

In direct metal laser sintering (DMLS), either single-component or multi-component metallic materials are used. DMLS multi-component powders consisting of different alloying elements are particularly used in this case. The low-melting component contained in the powder is molten by means of a laser beam and flows around the high-melting component that serves as structure provider.

In electron beam melting (EBM), the process sequence essentially corresponds to the laser-based method. In this case, loose metal powder, which is present in the form of a powder bed or introduced through a nozzle, or a wire is selectively molten and subsequently solidifies in the desired contour. The required energy input is realized by means of an electron beam. The method is usually carried out in a vacuum chamber that is flooded with inert gas.

Accordingly, a powder bed, a powder supply or a wire feed is used in generative manufacturing methods, wherein these starting materials are then molten by inputting energy, for example in the form of a laser beam, an electron beam or a plasma/arc, and subsequently solidified. Furthermore, process gases in the form of inert gases or active gases are used in generative manufacturing methods.

Generative manufacturing methods are frequently carried out in a processing chamber that is filled with a process gas. In this context, it is common practice to use an inert gas, in which the contaminants have to be strictly controlled. For example, the oxygen content cannot exceed a certain threshold value. Another example of contaminants is the moisture in the processing chamber, which likewise has to be strictly controlled.

The process gas is contaminated, for example, when the processing chamber is opened. Ambient air is admitted into the processing chamber during the removal of a finished component and the subsequent production of a new component. Another source of contaminants is the powder itself, which may have absorbed contaminants on the surface of the particles, wherein these contaminants are then released during the melting process and thereby contaminate the process gas atmosphere.

The present invention is therefore based on the objective of making available a generative manufacturing method, in which an enhanced control of the process gas atmosphere in the processing chamber can be achieved.

The invention particularly should allow an enhanced control of the oxygen content and/or the dew point of the process gases.

All or some of these objectives are attained by means of the independent claims. Advantageous embodiments are disclosed in the dependent claims.

SUMMARY OF THE INVENTION

According to the invention, a method for the generative manufacture of a three-dimensional component in a processing chamber is proposed, wherein the steps providing a metallic starting material in the processing chamber and melting the starting material by means of energy input are repeated multiple times.

In this case, a process gas is provided in the processing chamber. The oxygen content of the process gas is determined.

The inventive method is characterized in that the following steps are carried out:

Step 1. The hydrogen content of the process gas is determined.

Step 2. The oxygen content of the process gas is determined by means of an oxygen sensor and/or the dew point of the process gas is determined.

Step 3. The values for the oxygen content and/or the dew point determined in step 2 are corrected by means of the value for the hydrogen content determined in step 1.

Steps 1-3 may be carried out simultaneously with the steps "providing a metallic starting material in the processing chamber" and "melting the starting material by means of energy input," between these two steps or after one or more of these steps.

In the context of the present invention, a generative manufacturing method refers to the production of a three-dimensional component in layers by utilizing a powder bed, a powder supply or a wire feed, which serve as starting material that is molten by inputting energy, for example in the form of a laser beam, an electron beam or a plasma or arc. In this respect, we refer to the generative manufacturing methods cited in the introduction to the description (3D printing or the solidification by means of chemical activators, melting and solidifying (laser-engineered net shaping (LENS), direct metal deposition (DMD) or laser additive manufacturing (LAM)), local sintering or melting (laser sintering (SLS)), metal laser sintering (DMLS), metal laser sintering (ILMS) or electron beam melting (EBM)).

During the course of tests that preceded the invention, it was determined that the process gas may during the energy input be locally heated at the processing site, i.e. at the point at which the starting material is subjected to the energy input, to such a degree that water vapor contained in the process gas breaks down into hydrogen and oxygen. Consequently, an increased oxygen concentration may be present at the processing site during the melting process of the starting material.

The oxygen content of the process gas can be determined by means of an oxygen sensor. For example, a so-called lambda probe is used for this purpose. A lambda probe compares the oxygen content in the process gas with the known oxygen content of a reference gas, typically with the oxygen content of air. In this case, the ability of certain ceramics to transport oxygen ions electrolytically is utilized. If one side of the ceramic is exposed to a reference gas and the other side of the ceramic is exposed to a process gas, a stress representing a measure for the different partial oxygen pressure of the two gases is generated. The oxygen content of the process gas can be determined thereof if the reference gas is known.

However, the electrolytic conductivity of many ceramics only occurs at elevated temperatures, for example at 700° C. The lambda probe and the process gas are therefore heated accordingly for the measurement of the oxygen content. At 700° C., the oxygen of the process gas reacts with any hydrogen contained in the process gas such that water is formed. This means that the oxygen content of the process gas is lowered due to its measurement. Consequently, the value for the oxygen content determined by the lambda probe is lower than the actual oxygen content of the process gas at room temperature.

In order to determine the oxygen content of the process gas more accurately, the invention therefore proposes to initially determine the hydrogen content of the process gas. The hydrogen content is a measure for the dissociation of water due to the energy input during the melting process of the starting material and therefore a measure for the oxygen produced due to the dissociation of the water. To this end, the hydrogen content of the process gas is determined directly in the processing chamber or a sample of the process gas is taken and its hydrogen content is determined.

Subsequently, the oxygen content of the process gas is determined. The oxygen sensor used for this purpose may be arranged directly in the processing chamber or outside the processing chamber. Accordingly, the process gas, the oxygen content of which is determined, may either remain in the processing chamber or part of the process gas is extracted from the processing chamber and fed to the oxygen sensor in order to determine its oxygen content. This part of the process gas may consist of the same sample that was previously analyzed with respect to its hydrogen content. However, it is likewise possible to use different parts or samples of the process gas for determining the hydrogen content and for determining the oxygen content. For example, one of the two measurements, i.e. either the measurement of the hydrogen content or the measurement of the oxygen content, may take place in the processing chamber whereas the other measurement is carried out on a sample of the process gas that was previously extracted from the processing chamber.

Due to the occurring recombination of hydrogen and oxygen into water during the oxygen measurement, the determined value for the oxygen content of the process gas will be lower than the actual oxygen content of the process gas prior to the measurement.

According to the invention, the determined hydrogen content of the process gas or the sample is therefore used for correcting the determined oxygen content.

A lambda probe is preferably used as oxygen sensor. A lambda probe is inexpensive and has the advantage of very short reaction times. The invention eliminates the disadvantage of a lambda probe, namely a corruption of the measuring result due to the presence of hydrogen.

The hydrogen content of the process gas is advantageously determined by means of gas chromatography or a thermal conductivity detector.

In a preferred embodiment of the invention, part of the process gas is extracted from the processing chamber and once again returned into the processing chamber. Consequently, part of the process gas is recirculated. The determination of the hydrogen content or the oxygen content is advantageously carried out on the part of the process gas extracted from the processing chamber. It is particularly advantageous to determine the hydrogen content and the oxygen content on the part of the process gas extracted from the processing chamber. The part of the process gas extracted from the processing chamber is once again completely or partially returned into the processing chamber or otherwise discharged depending on the result of the hydrogen and oxygen content analyses.

Alternatively or additionally to the described correction of the oxygen measurement, the invention can also be used for correcting the dew point. As mentioned above, the process gas is heated if a lambda probe is used such that hydrogen and oxygen react and water is formed. A measurement of the dew point or the water content of the process gas would therefore also be corrupted by the lambda probe. Additionally or alternatively to the correction of the oxygen content, the measured value for the dew point therefore is according to the invention also corrected as described above with reference to the oxygen correction.

Analogous to the above-described method for determining the oxygen content of the process gas, the sensor used for the measurement of the dew point may also be arranged directly in the processing chamber or outside the processing chamber. Accordingly, the process gas, the dew point of which is determined, may either remain in the processing chamber or part of the process gas is extracted from the processing chamber and fed to the sensor in order to determine its dew point. One or more measurements of the hydrogen content, the oxygen content and the dew point may take place in the processing chamber or outside the processing chamber.

In addition, other parameters of the process gas located in the processing chamber or of the process gas stream extracted from the processing chamber can also be determined and, if applicable, compared with a nominal value. For example, the water vapor content of the process gas extracted from the processing chamber or the water vapor content of the gas atmosphere in the processing chamber can be determined and compared with a predefined nominal value. The gas stream is either completely, partially or not at all returned into the processing chamber depending on the result of the comparison between the determined value and the nominal value. Part of the extracted gas stream can also be discarded and replaced with inert gas introduced into the processing chamber depending on the result.

It is preferred to determine one or more of the following parameters of the gas stream extracted from the processing chamber: hydrogen content, oxygen content, water vapor content, dew point, carbon content or temperature. Alternatively or additionally, one or more of the following parameters of the process gas located in the processing chamber are determined: hydrogen content, oxygen content, water vapor content, dew point, carbon content or temperature.

The recirculated gas stream or newly added inert gas is introduced into the processing chamber through one or more inlets, wherein said inlets are preferably arranged in a lower region of the processing chamber. In this way, the process parameters remain stable and homogenous metallurgical effects can be achieved during the production. At least part of the process gas may be introduced, in particular, through the starting material in the form of a powder bed. During the generative manufacture of the component, a constant atmosphere is produced on the uppermost layer of the component due to the immediate proximity of the region, in which the process gas enters the processing chamber, to the powder bed and the processing site.

The inventive method preferably concerns a laser melting method. In this case, the starting material is locally molten by means of a laser beam.

The process gas used preferably consists of an inert gas that has a higher density than air at the same temperature, e.g. of argon. The inert gas preferably has a temperature that is lower than the temperature of the air present in the processing chamber at the beginning. In both instances, the process gas accumulates in the lower region of the processing chamber, in which the processing site is also located. For example, the heavier gaseous argon displaces the lighter air into the upper region of the processing chamber, in which an outlet for discharging air is provided.

Reactive components, particularly reactive gases such as CO or $CO_2$ or gases with sound thermal conductivity such as He, may also be added to the process gas.

The process gas may be set in turbulence within the processing chamber by means of at least one fan. In this way, a homogenous gas composition is made available over the entire volume of the processing chamber. The extracted sample therefore represents the composition of the process gas in the processing chamber very well.

The oxygen content of the process gas or of the process gas sample is determined in accordance with the invention. In an embodiment of the invention, an oxygen-free gas is supplied to the process gas and/or introduced into the processing chamber if the corrected value for the oxygen content is higher than a predefined comparative value. In this way, the oxygen content of the process gas in the processing chamber can be kept below a predefined maximum value.

In another embodiment of the invention, the oxygen content of a gas is measured by means of the oxygen sensor, as well as by means of an oxygen analyzer, prior to above-described steps 1-3. The oxygen analyzer used consists of a measuring or recording device that determines the oxygen content of the gas by means of a method, in which the hydrogen content of the gas has no effect on the determined value for the oxygen content. If an oxygen sensor in the form of a lambda probe would be used, however, the determined value for the oxygen content would be dependent on the hydrogen content of the gas because oxygen and hydrogen can react during the measurement and form water due to the measuring principle of such an oxygen sensor.

The difference between the value measured with the oxygen sensor, which is potentially corrupted due to the hydrogen content of the gas, and the value measured with the oxygen analyzer, which is not dependent on the hydrogen content of the gas, is then correlated with the measured hydrogen content and this correlation is used for correcting the value for the oxygen content in step 3.

The oxygen sensor is therefore calibrated with the aid of the oxygen analyzer. This means that the correlation between the hydrogen content of a gas and the value for the oxygen content determined with the oxygen sensor is initially established by means of the oxygen analyzer and this correlation is subsequently used for correcting the value for the oxygen content during the actual measurement.

This calibration is preferably carried out with the process gas. However, a different gas may also be used for the calibration.

BRIEF DESCRIPTION OF THE DRAWINGS

The invention, as well as further details of the invention, are elucidated below with reference to exemplary embodiments that are schematically illustrated in the drawings. In these drawings.

DETAILED DESCRIPTION OF THE INVENTION

Figure 1:
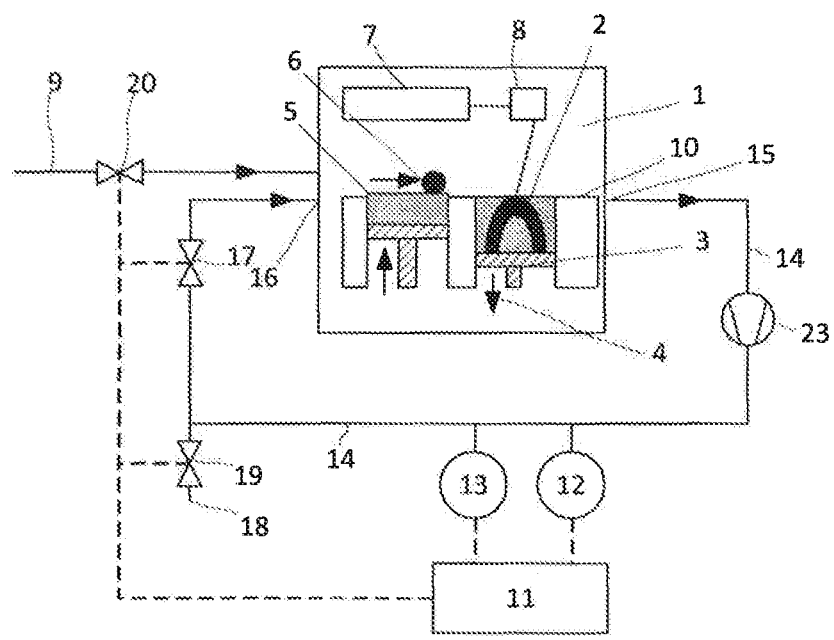
FIG. 1 shows a first inventive device for the generative manufacture of a 3-dimensional component and FIG. 2 shows an alternative embodiment of the invention.

FIG. 1 shows a schematic representation of a device for carrying out the inventive method.

A device for the generative manufacture of a three-dimensional component is described below. As already mentioned above, however, the inventive method is not limited to the illustrated device for the generative manufacture of three-dimensional components.

The device is a laser melting device. The laser melting device comprises a processing chamber 1 that serves as production space for the three-dimensional component 2.

A production platform 3 for accommodating the component 2 to be manufactured is arranged in the processing chamber 1. The production platform 3 features a height adjusting device 4, by means of which the production platform 3 can be adjusted in the vertical direction.

The device 1 also comprises a reservoir 5. The reservoir 5 is designed for accommodating a powdery starting material that can be solidified.

In addition, an application device 6 is provided for applying the starting material onto the production platform 3. Such an application device 6 can be moved in the horizontal direction parallel to the working plane 10.

A laser 7 for generating a laser beam is furthermore provided. A laser beam generated by the laser 7 is deflected by means of a deflection device 8 and focused on a predefined point directly underneath or in the working plane 10 by means of a (not-shown) focusing device. The deflection device 8 makes it possible to change the path of the laser beam in such a way that it melts the locations of the applied layer, which correspond to the cross section of the object 2 to be manufactured.

A process gas supply device 9 is furthermore provided for supplying the processing chamber 1 with a process gas.

The process gas supply device 9 features one or more reservoirs for the process gas or individual components of the process gas, wherein the (not-shown) process gas reservoir is connected to (not-shown) inlets leading into the processing chamber by means of one or more line sections. The inlets for introducing the process gas are realized, e.g., in the form of one or more nozzles and arranged in a lower region of the processing chamber 1. The amount of gas being introduced can be adjusted by means of a control valve 20. It is preferred that at least one nozzle of the process gas supply device is arranged in the region of the bottom of the processing chamber 1 or at a fifth, a quarter, half, two thirds or three quarters of the height between the bottom of the processing chamber 1 and the working plane 10 or approximately at the height of the working plane 10.

The process gas used preferably consists of an inert gas that has a higher density than air at the same temperature, e.g. of argon.

A (not-shown) fan is likewise arranged in a lower region of the processing chamber. Multiple fans may also be provided.

A recirculation line 14 for part of the process gas is furthermore provided. Part of the process gas can be extracted from the processing chamber 1 through an outlet 15, conveyed through the recirculation line 14 and once again returned into the processing chamber 1 through the inlet 16. The process gas is recirculated, for example, by means of a blower or a compressor 23. A control valve 17 is also provided in the recirculation line 14 in order to adjust the amount of gas being returned into the processing chamber 1. In addition, a line 18 branches off the recirculation line 14 and makes it possible to extract the process gas being conveyed through the recirculation line 14. The line 18 is likewise provided with a control valve 19.

The device furthermore comprises a control unit 11 for controlling the control valve 20 of the process gas supply device 9 and the control valves 17 and 19. The control unit 11 may comprise one or preferably two (not-shown) control devices in a closed control loop. The control devices may also comprise a P-controller, an I-controller, a D-controller or combinations thereof such as a PID-controller.

In addition, a measuring sensor 12 is provided for determining the hydrogen content of the process gas being conveyed through the recirculation line 14 and a lambda probe 13 is provided for determining the oxygen content of the process gas being conveyed through the recirculation line 14. The measuring sensor 12 and the lambda probe 13 are connected to the control unit 11.

An inventive method is described below with reference to an exemplary embodiment.

Argon is introduced into a lower region of the processing chamber 1 as processing gas. Since the process gas supply device 9 introduces the process gas at or below the height of the working plane 10, the processing chamber 1 is filled with the process gas from the bottom toward the top.

In this way, the heavier gaseous argon displaces the lighter air into an upper region of the processing chamber 1, in which a (not-shown) outlet for discharging the air is provided.

If applicable, the process gas located in the processing chamber 1 can be set in turbulence within the processing chamber 1 by means of a fan. Contaminants are removed from the dead spaces of the processing chamber due to these turbulences. In addition, a homogenous gas composition is made available over the entire volume of the processing chamber. Clean process gas can furthermore be supplied to the processing chamber 1 by means of the process gas supply device 9.

A metallic starting material is respectively applied or provided on the production platform 3 in the form of a powder bed by means of the application device 6. The metallic starting material may alternatively also be supplied by means of a powder supply or a wire feed.

The laser 7 subsequently melts the starting material. The two steps "providing starting material on the production platform 3" and "melting the starting material" are repeated multiple times such that the component is produced in layers.

It was determined that the water or water vapor present in the process gas locally breaks down into hydrogen and oxygen due to the energy being input with the laser during the melting process of the starting material.

However, the oxygen content of the process gas should remain below a predefined maximum value during the manufacturing process in order to prevent undesirable oxidations. According to the invention, the oxygen content of the process gas is therefore monitored. For this purpose, a sample of the process gas being conveyed through the recirculation line 14 is fed to the lambda probe 13 and the oxygen content of the sample is determined by means of the lambda probe 13. The thusly determined value for the oxygen content is transmitted to the control unit 11.

The sample is heated in the lambda probe 13 such that hydrogen and oxygen can recombine into water. The value for the oxygen content of the sample determined by the lambda probe 13 is therefore dependent on the hydrogen content of the sample. The higher the hydrogen content of the sample, the lower the value for the oxygen content indicated by the lambda probe 13 because correspondingly more oxygen reacts with the hydrogen and forms water.

This is the reason why the hydrogen content of the process gas or of the process gas being recirculated is determined in addition to the measurement of the oxygen content. For this purpose, a second sample of the process gas is taken and its hydrogen content is determined by means of a measuring sensor 12.

The second sample may be taken upstream or downstream of the location, at which the sample for determining the oxygen content is taken. However, it is also possible to use the same sample for determining the oxygen content and for determining the hydrogen content. In this case, it is advantageous to initially determine the hydrogen content because the measurement by means of the lambda probe 13 also affects the hydrogen content of the sample.

The value for the hydrogen content determined by the measuring sensor 12 is likewise transmitted to the control unit 11. The determined value for the hydrogen content is then used in the control unit 11 for correcting the determined value for the oxygen content. The process gas composition in the processing chamber 1 is then controlled in dependence on the corrected value for the oxygen content. For this purpose, part of the original process gas atmosphere can be discharged through the line 18 and/or the composition and/or amount of the process gas being supplied by the process gas supply device 9 can be changed.

Figure 2:
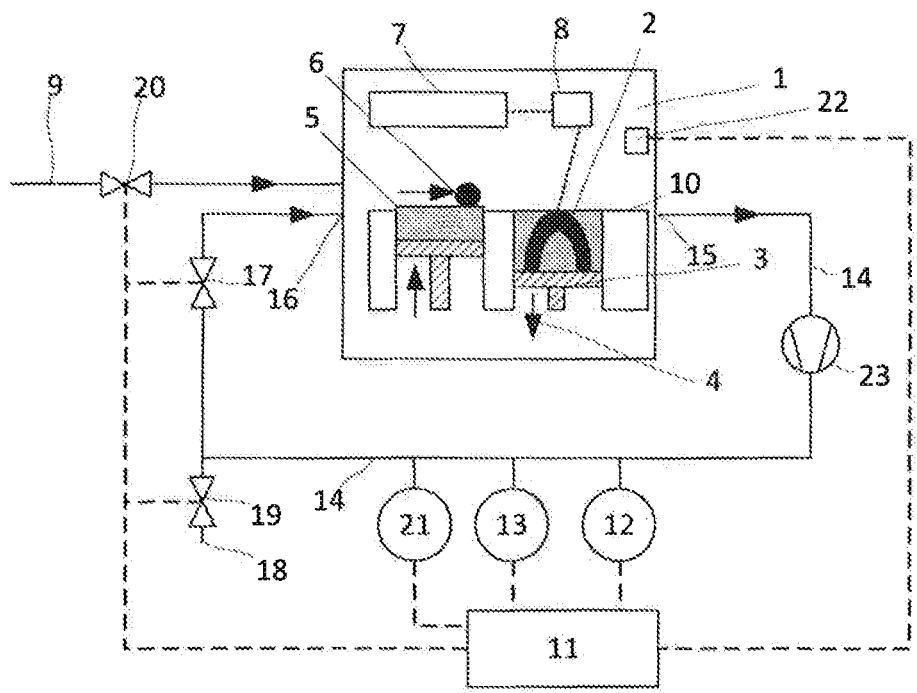

FIG. 2 shows another embodiment of the invention. Identical components are identified by the same reference symbols in both figures.

The embodiment according to FIG. 2 essentially can be distinguished from the embodiment according to FIG. 1 in that an additional sensor 21 is provided for determining the water vapor content or the dew point of the process gas being recirculated. The value for the water vapor content determined with the sensor 21 is likewise transmitted to the control unit 11 and, if applicable, corrected with the aid of the determined hydrogen content in the control unit 11.

Furthermore, individual or all of the parameters oxygen content, hydrogen content and water vapor content, as well as other parameters such as temperature, carbon content, etc., can also be determined directly in the processing chamber 1. This is indicated with an exemplary sensor 22 in FIG. 2. The value or values measured in the process chamber 1 are advantageously also transmitted to the control unit 11 and used for controlling the composition of the process gas atmosphere.

LIST OF REFERENCE SYMBOLS

1 Processing chamber
2 Component
3 Production platform
4 Height adjusting device
5 Reservoir
6 Application device
7 Laser
8 Deflection device
9 Process gas supply device
10 Working plane
11 Control unit
12 Measuring sensor
13 Lambda probe
14 Recirculation line
15 Outlet
16 Inlet
17 Control valve
18 Line
19 Control valve
20 Control valve
21 Water vapor measurement
22 Sensor
23 Blower

What we claim is:

1. A method for generative manufacture of a three dimensional component in a processing chamber, wherein the method comprises: repeatedly providing a metallic starting material in the processing chamber multiple times and repeatedly melting the metallic starting material by energy input in the processing chamber multiple times; providing a process gas in the processing chamber; determining an oxygen content of the process gas, wherein the determining of the oxygen content includes:
    Step 1) initially measuring a hydrogen content of the process gas,
    Step 2) subsequently measuring the oxygen content of the process gas with an oxygen sensor, and optionally a dew point of the process gas, and
    Step 3) correcting at least one of values for the oxygen content, and optionally the dew point measured in the Step 2 by a value of the hydrogen content measured in the Step 1;
extracting part of the process gas from the processing chamber;
further measuring at least one of the oxygen content, and the hydrogen content of the part of the process gas extracted from the processing chamber; and
recirculating and returning the part of the process gas into the processing chamber, wherein at least a portion of the part is discarded before the returning and the discarded portion is replaced with inert gas introduced into the processing chamber based upon the further measuring at least one of the oxygen content, and the hydrogen content of the part.

2. The method according to claim 1, characterized in that the oxygen content is measured by a lambda probe.

3. The method according to claim 1, characterized in that the hydrogen content is measured by gas chromatography or optionally by a thermal conductivity detector.

4. The method according to claim 1, wherein the subsequent measuring of the oxygen content of the process gas is by the oxygen sensor and an oxygen analyzer prior to the step 3, wherein a difference between a value measured with the oxygen sensor and a value measured with the oxygen analyzer is correlated with the hydrogen content initially measured, and a resulting correlation is used for correcting the value for the oxygen content in the Step 3.

5. The method according to claim 1, further comprising supplying an oxygen-free gas to the process gas if the correcting value for the oxygen content is higher than a predefined comparative value.

6. The method according to claim 1, characterized in that the energy input for melting the metallic starting material is provided by a laser.

7. The method according to claim 1, characterized in that the process gas comprises the inert gas.

8. The method according to claim 7, characterized in that the inert gas comprises argon.

* * * * *